United States Patent
Emoto et al.

(10) Patent No.: US 9,444,356 B2
(45) Date of Patent: Sep. 13, 2016

(54) POWER SUPPLY DEVICE AND POWER SUPPLY SWITCHING METHOD

(71) Applicant: MITSUBISHI HITACHI POWER SYSTEMS, LTD., Kanagawa (JP)

(72) Inventors: Hideaki Emoto, Tokyo (JP); Mitsuyuki Shirae, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 43 days.

(21) Appl. No.: 14/366,147

(22) PCT Filed: Dec. 25, 2012

(86) PCT No.: PCT/JP2012/083520
§ 371 (c)(1),
(2) Date: Jun. 17, 2014

(87) PCT Pub. No.: WO2013/099880
PCT Pub. Date: Jul. 4, 2013

(65) Prior Publication Data
US 2014/0340947 A1 Nov. 20, 2014

(30) Foreign Application Priority Data

Dec. 28, 2011 (JP) .................................. 2011-290132

(51) Int. Cl.
*H02J 1/02* (2006.01)
*H02M 3/335* (2006.01)
(Continued)

(52) U.S. Cl.
CPC .......... *H02M 3/33569* (2013.01); *H02J 3/005* (2013.01); *H02J 9/06* (2013.01);
(Continued)

(58) Field of Classification Search
CPC .............. H02J 1/04; H02J 1/108; H02J 1/02; H02M 1/08; H02M 3/285; H02M 3/33507; H02M 3/33569; H02M 2001/0038

USPC ................. 363/65, 67, 71, 72, 50; 282/272; 307/52, 58
See application file for complete search history.

(56) References Cited

U.S. PATENT DOCUMENTS 5,808,453 A * 9/1998 Lee .......................... H02J 1/102
323/224
5,834,925 A * 11/1998 Chesavage .............. H02J 1/108
307/58

(Continued)

FOREIGN PATENT DOCUMENTS

| CN | 101055987 | 10/2007 |
| CN | 101548457 | 9/2009 |

(Continued)

OTHER PUBLICATIONS

Office Action issued Mar. 16, 2015 in corresponding Chinese patent application No. 201280064523.1 (with English translation).

(Continued)

*Primary Examiner* — Gary L Laxton
*Assistant Examiner* — Kyle J Moody
(74) *Attorney, Agent, or Firm* — Wenderoth, Lind & Ponack, L.L.P.

(57) ABSTRACT

A power supply device (10) includes a plurality of constant current output circuits (14) that can supply power to a load (12). The constant current output circuit includes a pulse generation unit (20), and a PI feedback control unit (30) that performs feedback control on the pulse voltage output from the pulse generation unit. When an abnormality occurs in the constant current output circuit that supplies power to the load and the constant current output circuit that supplies power to the load is switched, a cycle of the feedback control, which is performed for the pulse generation unit of the constant current output circuit corresponding to a switching destination, is changed to a second cycle higher than a first cycle in the constant current output circuit that is not yet switched.

7 Claims, 3 Drawing Sheets

(51) Int. Cl.
*H02M 3/28* (2006.01)
*H02M 1/08* (2006.01)
*H02J 3/00* (2006.01)
*H02J 9/06* (2006.01)
H02M 1/32 (2007.01)
H02J 1/04 (2006.01)
H02J 1/10 (2006.01)
H02M 1/00 (2006.01)

(52) U.S. Cl.
CPC ............ *H02M 1/08* (2013.01); *H02M 3/285* (2013.01); *H02M 3/33507* (2013.01); *H02M 3/33561* (2013.01); *H02J 1/04* (2013.01); *H02J 1/102* (2013.01); *H02M 2001/0038* (2013.01)

(56) References Cited

U.S. PATENT DOCUMENTS

| | | | | |
|---|---|---|---|---|
| 6,301,133 | B1* | 10/2001 | Cuadra | H02J 1/102 363/65 |
| 6,958,552 | B2* | 10/2005 | Dodson, III | H02J 1/108 307/52 |
| 7,259,473 | B2* | 8/2007 | Petricek | H02J 1/10 307/44 |
| 7,408,475 | B2* | 8/2008 | Sugama | G01R 31/31721 323/285 |
| 7,489,117 | B2* | 2/2009 | Jain | H02M 3/158 323/224 |
| 8,063,617 | B2* | 11/2011 | Wang | H02M 3/1584 323/272 |
| 8,331,117 | B2* | 12/2012 | Shih | H02M 3/33561 307/58 |
| 8,710,810 | B1* | 4/2014 | McJimsey | H02M 3/1584 323/272 |
| 2005/0285619 | A1* | 12/2005 | Williams | H02M 3/1584 324/764.01 |
| 2010/0085024 | A1* | 4/2010 | Houston | H02M 3/1584 323/281 |
| 2010/0127680 | A1* | 5/2010 | Satterfield | H02M 3/156 323/282 |
| 2014/0132233 | A1* | 5/2014 | Park | H02H 7/1213 323/272 |
| 2014/0192570 | A1* | 7/2014 | Nielsen | F03D 9/003 363/50 |
| 2014/0346882 | A1* | 11/2014 | Emoto | H02J 1/04 307/65 |
| 2015/0103564 | A1* | 4/2015 | Duan | H02M 3/285 363/21.02 |

FOREIGN PATENT DOCUMENTS

| | | |
|---|---|---|
| JP | 2002-199742 | 7/2002 |
| JP | 2005-222728 | 8/2005 |
| JP | 2008-172979 | 7/2008 |
| JP | 2009-168529 | 7/2009 |
| JP | 2009-168530 | 7/2009 |
| JP | 2009-168531 | 7/2009 |
| JP | 2009-168532 | 7/2009 |
| JP | 2009-168533 | 7/2009 |
| JP | 2009-232587 | 10/2009 |
| JP | 2010-110136 | 5/2010 |
| JP | 2011-4503 | 1/2011 |

OTHER PUBLICATIONS

International Search Report issued Mar. 12, 2013 in International Application No. PCT/JP2012/083520.
Written Opinion of the International Searching Authority issued Mar. 12, 2013 in International Application No. PCT/JP2012/083520.
Informal Comments (with English translation) submitted in response to the Written Opinion of the International Searching Authority issued in International Application No. PCT/JP2012/083520.
Decision to Grant a Patent issued Nov. 4, 2015 in corresponding Japanese patent application No. 2011-290132 (with English translation).
Office Action issued Aug. 11, 2015 in corresponding Japanese patent application No. 2011-290132 (with English translation).
Notification of the Decision to Grant a Patent Right for Patent for Invention issued May 6, 2016 in Chinese patent application No. 20128064523.1 (with English translation).

\* cited by examiner

POWER SUPPLY DEVICE AND POWER SUPPLY SWITCHING METHOD

TECHNICAL FIELD

The present invention relates to a power supply device and a power supply switching method.

BACKGROUND ART

A power supply device, which uses a device used at a power plant or the like (an electromagnetic valve, a motor, or the like) as a load and supplies power to the load, (for example, a current output circuit for setting current, which flows in the load, to a prescribed value) is subjected to soundness diagnosis for the improvement of reliability thereof.

As a method of diagnosing soundness, for example, PTL 1 discloses a method including: a step of directly connecting means for generating an AC voltage including a rectangular pulse to the primary side of a transformer or connecting the means to the primary side of the transformer through a rectifying circuit; a step of directly connecting a drive target, which is to be subjected to any one of measurement, drive, and control, to the secondary side of the transformer or connecting the drive target to the secondary side of the transformer through a rectifying circuit; a step of measuring the change of primary-side current, which is caused by current consumption caused by the operation of the drive target connected to the secondary side, by power supplied through the transformer; and a step of diagnosing an operation and a signal state of the drive target by a result of the measurement.

Further, multiple (for example, two) power supply means are provided in a power supply device, and power supply means that supplies power to a load is switched to the other power supply means when abnormality occurs in power supply means that supplies power to the load.

CITATION LIST

Patent Literature

[PTL 1] JP-A-2009-168529

SUMMARY OF INVENTION

Technical Problem

However, when abnormality occurs in power supply means that supplies power to the load and the power supply means that supplies power to the load is switched to the other power supply means, the power supply device should change the output of the other power supply means to a value, which is required by the load, in a shorter period of time.

In particular, when the power supply means is switched, the power supply means including a pulse generation unit, which changes power supplied from a power source into a pulse voltage and supplies the pulse voltage to the load, should change the pulse voltage into a pulse voltage, which corresponds to the load, in a short period of time. However, since power supply means corresponding to a switching destination does not have information about the load, it is difficult for the power supply means to output a pulse voltage, which corresponds to the load, in a short period of time.

The invention has been made in consideration of these circumstances, and an object of the invention is to provide a power supply device and a power supply switching method capable of changing power, which is output from power supply means corresponding to a switching destination, to power, which is required by a load, in a shorter period of time even though power supply means supplying power to the load is switched.

Solution to Problem

In order to achieve the object, a power supply device and a power supply switching method of the invention employ the following means.

A power supply device according to an aspect of the invention includes a plurality of power supply means capable of supplying power to the same load. Power is supplied to the load by one of the power supply means. When abnormality occurs in the power supply means that supplies power to the load, the power supply means supplying power to the load is switched to the other power supply means. The power supply means includes pulse generating means for generating a pulse voltage having a pulse width corresponding to a voltage and current to be output, and feedback control means for performing feedback control on the pulse voltage, which is output from the pulse generating means, so that the current flowing in the load reaches a prescribed value. When abnormality occurs in the power supply means supplying power to the load and the power supply means that supplies power to the load is switched to the other power supply means, a cycle of the feedback control, which is performed for the pulse generating means of the power supply means corresponding to a switching destination, is changed to a second cycle higher than a first cycle in the power supply means that is not yet switched.

According to this configuration, the power supply device includes the plurality of power supply means capable of supplying power to the same load, power is supplied to the load by one power supply means, and the power supply means supplying power to the load is switched to the other power supply means when abnormality occurs in the power supply means that supplies power to the load. Accordingly, the delay of the supply of power to the load is prevented.

The power supply means includes pulse generating means for generating a pulse voltage having a pulse width corresponding to a voltage and current to be output, and feedback control means for performing feedback control on the pulse voltage, which is output from the pulse generating means, so that the current flowing in the load reaches a prescribed value.

Here, when switching the power supply means, which supplies power to the load, to the other power supply means, the power supply device should change a pulse voltage, which is output from the other power supply means, to a pulse voltage corresponding to the load, in a short period of time in order to change power, which is output from the other power supply means, to power, which is required by the load, in a short period of time.

Further, when abnormality occurs in the power supply means that supplies power to the load and the power supply device switches the power supply means, which supplies power to the load, to the other power supply means, the power supply device changes the cycle of the feedback control, which is performed for the pulse generating means of the power supply means corresponding to the switching destination, to a cycle that is higher (shorter) than the cycle in the power supply means that is not yet switched.

The cycle of the feedback control is set to be higher in this configuration as described above, so that feedback control is performed more times in a short period of time. Accordingly, the pulse voltage output from the pulse generating means is controlled in a shorter period of time so that current flowing in the load reaches a prescribed value. For this reason, even though the power supply means supplying power to the load is switched, power, which is output from the power supply means corresponding to the switching destination, can be changed to power, which is required by the load, in a shorter period of time in this configuration.

Further, in the first aspect, it is preferable that the second cycle be set to a cycle that is higher than a time constant required until current flowing in the load becomes stable after starting to change due to the feedback control performed for the pulse generating means.

Current flowing in the load changes with the change of the pulse voltage, which is output from the pulse generating means, by feedback control. However, until the current flowing in the load becomes stable after the start of change thereof, the current flowing in the load has a prescribed time constant. Further, in the past, the cycle (first cycle) of the feedback control has been set to a cycle lower (longer) than the time constant. However, in this configuration, the second cycle of the feedback control, which is performed for the pulse generating means of the power supply means corresponding to the switching destination, is set to a cycle that is higher than a time constant required until current flowing in the load becomes stable after starting to change. Accordingly, it is possible to change power, which is output from the power supply means corresponding to the switching destination, to power, which is required by the load, in a shorter period of time.

Furthermore, in the first aspect, it is preferable that the feedback control means estimate the current, which flows in the load, on the basis of the time constant and perform the feedback control for the pulse generating means on the basis of a result of the estimation.

According to this configuration, feedback control for the pulse generating means of the power supply means, which corresponds to the switching destination, is performed at the second cycle that is higher than the time constant required until current flowing in the load becomes stable after starting to change. However, to perform feedback control at a cycle higher than the time constant is to detect the current flowing in the load before the current flowing in the load becomes stable. Accordingly, stable current, which flows in the load, is not accurately detected. For this reason, in this configuration, feedback control for the pulse generating means is performed on the basis of the current that flows in the load and is estimated on the basis of the time constant. Accordingly, even though feedback control for the pulse generating means is performed at a higher cycle, current flowing in the load is accurately controlled in this configuration.

Moreover, in the first aspect, it is preferable that the cycle of the feedback control be changed to the first cycle from the second cycle when a prescribed time has passed after the power supply means supplying power to the load is switched to the other power supply means.

Feedback control performed at the second cycle is performed earlier than the first cycle, but the accuracy thereof is lower than the accuracy of the feedback control performed at the first cycle. Further, since the current flowing in the load substantially reaches the prescribed value when the prescribed time has passed after the switching of the power supply means, it is possible to more accurately control the current, which flows in the load, by changing the cycle of feedback control to the first cycle from the second cycle in this configuration.

Further, a power supply switching method according to a second aspect of the invention switches power supply means, which supply power to the same load, by using a power supply device including a plurality of power supply means. The power supply means includes pulse generating means for generating a pulse voltage having a pulse width corresponding to a voltage and current to be output and feedback control means for performing feedback control on the pulse voltage, which is output from the pulse generating means, so that the current flowing in the load reaches a prescribed value. The power supply switching method includes: a first step of determining whether or not abnormality has occurred in the power supply means that supplies power to the load; and a second step of changing a cycle of the feedback control, which is performed for the pulse generating means of the power supply means corresponding to a switching destination, to a second cycle higher than a first cycle in the power supply means that is not yet switched, when it is determined that abnormality occurs in the power supply means that supplies power to the load and the power supply means supplying power to the load is switched to the other power supply means.

Advantageous Effects of Invention

According to the invention, there is an advantageous effect of changing power, which is output from power supply means corresponding to a switching destination, to power, which is required by a load, in a shorter period of time even though power supply means supplying power to the load is switched.

DESCRIPTION OF EMBODIMENTS

A power supply device and a power supply switching method according to embodiments of the invention will be described below with reference to the drawings.

Figure 1:
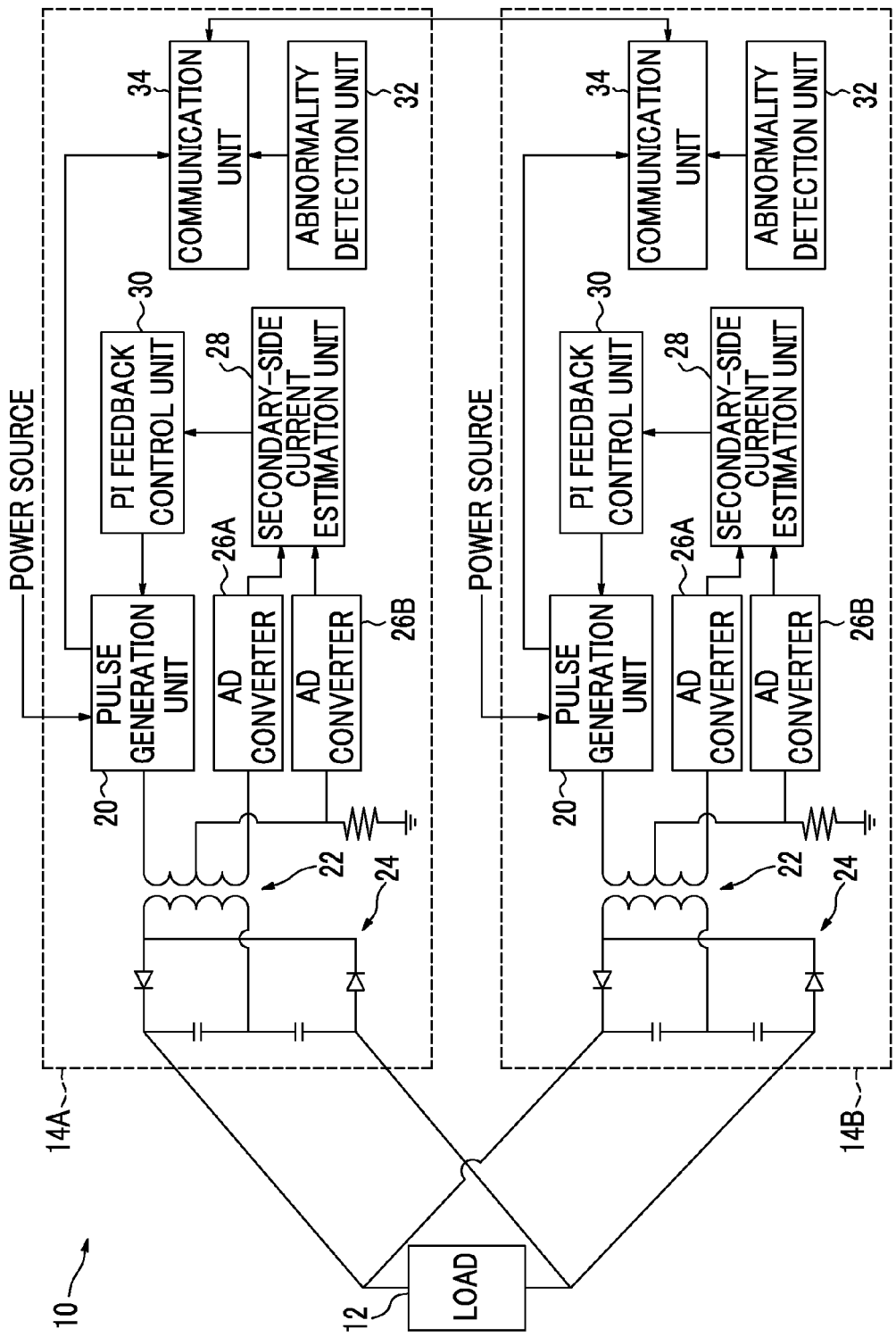
FIG. 1 is a view showing the configuration of a power supply device according to an embodiment of the invention.

FIG. 1 is a block diagram showing the configuration of a power supply device 10 according to this embodiment. The power supply device 10 according to this embodiment is provided at a power plant as an example, and uses a device, which is used at the power plant, (an electromagnetic valve, a motor, or the like) as a load 12. Further, the power supply device 10 includes constant current output circuits 14A and 14B, which allow current having a prescribed value to flow to the load 12, as power supply means capable of supplying power to the load 12. In the following description, either A or B is added to the end of a reference numeral when the respective constant current output circuits 14A and 14B are to be distinguished from each other, and either A or B added to the end of a reference numeral is omitted when the respective constant current output circuits 14A and 14B do not need to be distinguished from each other.

The power supply device 10 supplies power to the load 12 by one constant current output circuit 14. When abnormality occurs in the constant current output circuit 14 that supplies power to the load 12, the power supply device 10 switches the constant current output circuit 14, which supplies power to the load 12, to the other constant current output circuit 14. That is, since the power supply device 10 includes two constant current output circuits 14, the power supply device 10 supplies power to the load 12 by one constant current output circuit 14 and makes the other constant current output circuit 14 be on standby as a standby unit. Meanwhile, the constant current output circuit 14 serving as the standby unit is in a state in which power is applied to the constant current output circuit 14 so that the constant current output circuit 14 can supply power to the load 12 at any time and the constant current output circuit 14 does not supply power (hereinafter, referred to as a "standby state"). Since multiple (two in this embodiment) constant current output circuits 14 are provided as described above, the delay of the supply of power to the load 12 is prevented.

The constant current output circuit 14 includes a pulse generation unit 20, an insulation transformer 22, and a rectifying unit 24.

The pulse generation unit 20 is connected to the primary side of the insulation transformer 22, is supplied with power from a power source, and generates a pulse voltage having a pulse width corresponding to a voltage and current to be output. That is, the constant current output circuit 14 changes current, which is allowed to flow to the load 12, to constant current by the pulse width modulation (PWM) that is performed by the pulse generation unit 20. A pulse voltage, which is generated by the pulse generation unit 20, is an AC voltage that is formed of a rectangular wave or a sine wave. Meanwhile, the standby state in which the above-mentioned constant current output circuit 14 does not supply power to the load 12 means a state in which at least the pulse generation unit 20 is not driven.

The rectifying unit 24 is connected to the secondary side of the insulation transformer 22, and rectifies a voltage, which is output from the insulation transformer 22, by a diode and a capacitor, and applies the rectified voltage to the load 12.

Further, the constant current output circuit 14 includes AD converters 26A and 26B, a secondary-side current estimation unit 28, and a proportional-integral (PI) feedback control unit 30.

The AD converter 26A converts a voltage value, which is output from the pulse generation unit 20, into a digital value (voltage value) (hereinafter, referred to as "AD conversion (analog-digital conversion))", and outputs the digital value to the secondary-side current estimation unit 28.

The AD converter 26B converts a primary-side current value into a digital value (voltage value) (AD conversion), and outputs the digital value to the secondary-side current estimation unit 28.

The secondary-side current estimation unit 28 estimates a value of current, which flows in the secondary side, that is, the load 12, (hereinafter, referred to as "load current".) on the basis of the voltage value that is input from the AD converter 26A and the voltage value that is input from the AD converter 26B, and outputs the estimated value to the PI feedback control unit 30.

The PI feedback control unit 30 performs feedback control on the pulse voltage, which is output from the pulse generation unit 20, so that the current flowing in the load 12 reaches a prescribed value (required current value). Specifically, the PI feedback control unit 30 determines a pulse width of a pulse voltage, which is a set value of the pulse generation unit 20 (hereinafter, referred to as a "PWM set value"), by PI control (proportional-integral control) that is based on the estimated value input from the secondary-side current estimation unit 28 and the required current value, and outputs the pulse width to the pulse generation unit 20. For this reason, the pulse generation unit 20 outputs a pulse voltage with the pulse width that is input from the PI feedback control unit 30. Accordingly, it is possible to more accurately set the load current to a prescribed value.

Further, the constant current output circuit 14 includes an abnormality detection unit 32 that detects whether or not abnormality has occurred in the constant current output circuit 14. The abnormality of the constant current output circuit 14 means, for example, a case in which current outside a predetermined range continues to flow to the load 12. When the occurrence of abnormality in the constant current output circuit 14 is detected by the abnormality detection unit 32, the constant current output circuit 14 that supplies power to the load 12 stops supplying power to the load 12. Furthermore, the abnormality detection unit 32 outputs an abnormality detection signal in accordance with the detection of abnormality. The abnormality detection signal is transmitted to the other constant current output circuit 14, which is in the standby state, through a communication unit 34.

When the other constant current output circuit 14, which is in the standby state, receives the abnormality detection signal, the constant current output circuit 14 having received the abnormality detection signal starts to drive the pulse generation unit 20. Accordingly, a source of supply of power to the load 12 is switched to the other constant current output circuit 14 that is in the standby state.

As described above, the constant current output circuit 14 according to this embodiment sets the load current to a prescribed value by feedback control. For this reason, when switching the constant current output circuit 14, which supplies power to the load 12, to the other constant current output circuit 14 that is in the standby state, the power supply device 10 should change a pulse voltage, which is output from the constant current output circuit 14 corresponding to a switching destination, to a pulse voltage corresponding to the load 12, in a short period of time in order to change power, which is output from the constant current output circuit 14 corresponding to the switching destination, to power, which is required by the load 12, in a shorter period of time.

Further, when abnormality occurs in the constant current output circuit 14 that supplies power to the load 12 and the power supply device 10 according to this embodiment switches the constant current output circuit 14, which supplies power to the load 12, to the other constant current output circuit 14, the power supply device 10 according to this embodiment changes the cycle of the feedback control, which is performed for the pulse generation unit 20 of the constant current output circuit 14 corresponding to the switching destination, to a second cycle that is higher (shorter) than a first cycle in the constant current output circuit 14 that is not yet switched. In other words, the first cycle is the cycle of feedback control at the time of the normal drive of the pulse generation unit 20.

Next, the operation of the power supply device 10 according to this embodiment will be described in detail by using a flowchart illustrating a flow of power supply switching processing according to this embodiment shown in FIG. 2.

Figure 2:
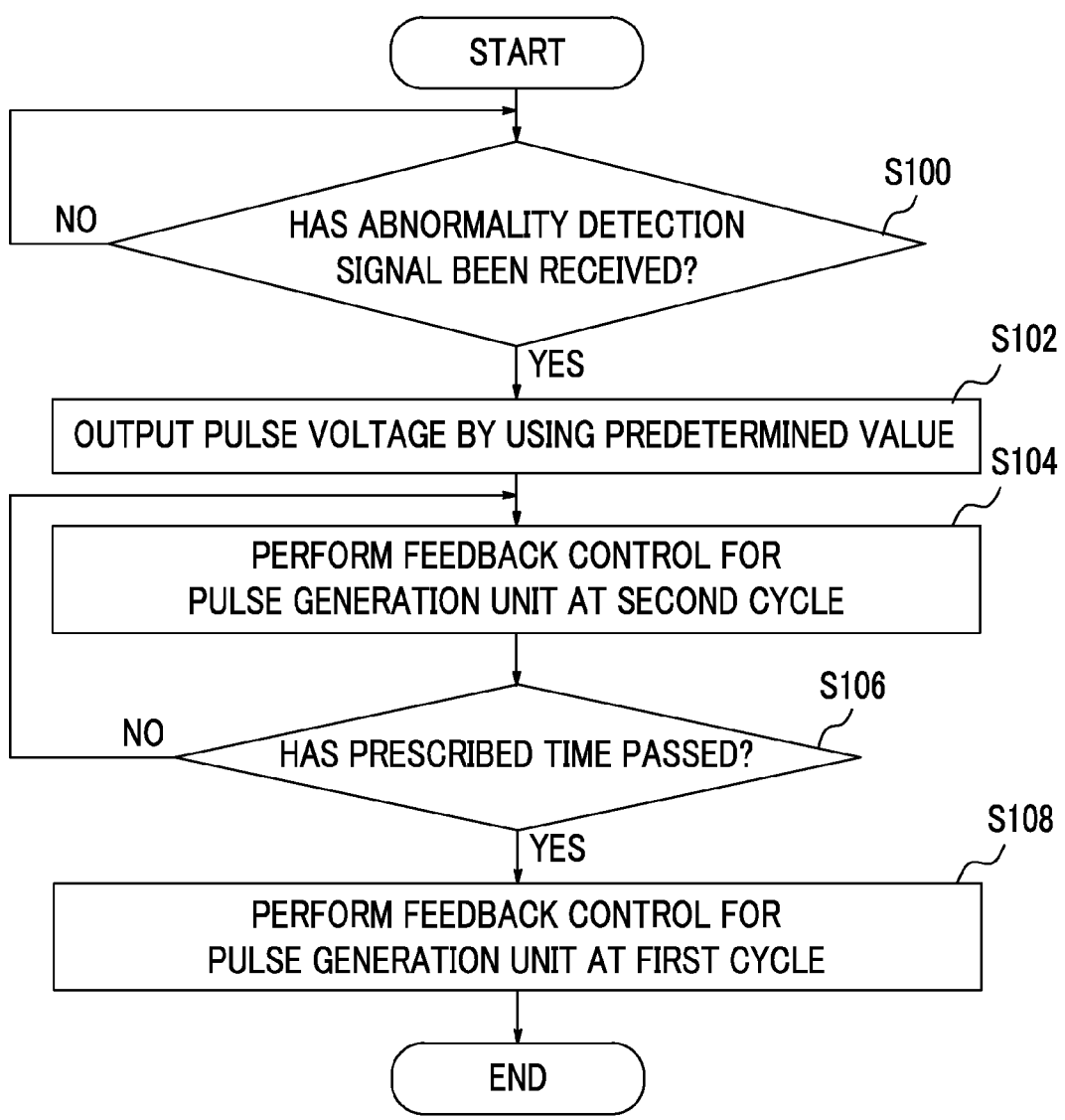
FIG. 2 is a flowchart illustrating a flow of power supply switching processing according to an embodiment of the invention.

Meanwhile, the flowchart shown in FIG. 2 is a flowchart illustrating the operation of the constant current output circuit 14B when the constant current output circuit 14A supplies power to the load 12 and the constant current output circuit 14B is in the standby state.

In Step 100, it is determined whether or not the abnormality detection signal has been received from the constant current output circuit 14A through the communication unit 34. If the abnormality detection signal has been received, the processing proceeds to Step 102. If the abnormality detection signal has not been received, the determination of whether or not the abnormality detection signal has been received is continuously repeated. Meanwhile, the determination of whether or not the abnormality detection signal has been received is performed by, for example, an arithmetic unit provided in the communication unit 34, and a result of the determination representing the receipt of the abnormality detection signal is output to the AD converters 26A and 26B, the secondary-side current estimation unit 28, and the PI feedback control unit 30 from the communication unit 34. When the abnormality detection unit 32 of the constant current output circuit 14A detects abnormality, the supply of power to the load 12 from the constant current output circuit 14A is stopped.

In Step 102, a pulse voltage, which is based on the PWM set value calculated by using a predetermined value (a gain used in the PI control or the like) by the PI feedback control unit 30, is output from the pulse generation unit 20. Accordingly, the supply of power to the load 12 from the constant current output circuit 14B is started. However, load current, which is obtained at this time, does not necessarily reach an appropriate value. The reason for this is that this load current is current supplied to obtain a feedback value required for feedback control.

In the next step 104, the pulse voltage output from the pulse generation unit 20 is subjected to feedback control at the second cycle by the PI feedback control unit 30 so that the load current reaches a prescribed value. Meanwhile, the AD converters 26A and 26B, the secondary-side current estimation unit 28, and the PI feedback control unit 30 start respective kinds of processing required for feedback control by using the result of determination, which is output from the communication unit 34 in Step 100, as a trigger. Accordingly, the supply of power to the load 12 from the constant current output circuit 14B is started.

Figure 3:
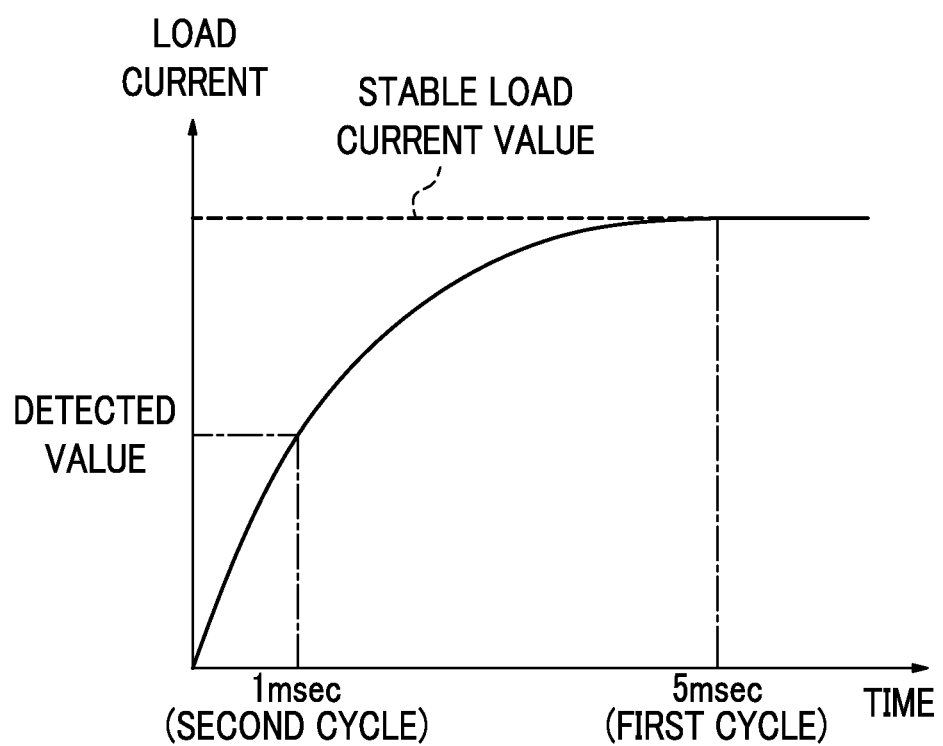
FIG. 3 is a graph showing a temporal change of load current that is caused by feedback control performed for a pulse generation unit according to an embodiment of the invention.

Here, the first cycle and the second cycle according to this embodiment will be described with reference to FIG. 3. FIG. 3 is a graph showing a temporal change of load current that is caused by feedback control performed for the pulse generation unit 20. Meanwhile, the first cycle is set to 5 msec and the second cycle is set to 1 msec by way of example in this embodiment, but the values of the first and second cycles are not limited thereto.

The load current is changed with the change of the pulse width of the pulse voltage, which is output from the pulse generation unit 20, by feedback control. However, until the load current becomes stable after the start of change thereof, the load current has a prescribed time constant as shown in FIG. 3.

Further, the first cycle, which is the cycle of feedback control at the time of the normal drive of the pulse generation unit 20, is lower (longer) than the time constant. When the first cycle is set to a cycle lower than the time constant, feedback control is performed on the basis of stable load current without change. Accordingly, it is possible to more accurately control load current.

Meanwhile, the second cycle is set to a cycle higher than the time constant. Accordingly, since the power supply device 10 according to this embodiment performs feedback control more times in a short period of time, the pulse voltage output from the pulse generation unit 20 is controlled in a shorter period of time so that the load current reaches a prescribed value.

Specifically, the AD converter 26B converts a primary-side current value into a digital value at the second cycle and outputs the digital value to the secondary-side current estimation unit 28, so that the feedback control by the second cycle is achieved. Further, the AD converter 26A also converts a primary-side voltage value into a digital value at the second cycle and outputs the digital value to the secondary-side current estimation unit 28.

As described above, the power supply device 10 according to this embodiment performs feedback control for the pulse generation unit 20 of the constant current output circuit 14, which corresponds to the switching destination, at the second cycle higher than a time constant required until the load current becomes stable after the start of change thereof. However, performing of feedback control at a cycle higher than the time constant is detecting load current before the load current becomes stable as shown in FIG. 3. Accordingly, stable load current is not accurately detected. For this reason, the power supply device 10 according to this embodiment estimates load current on the basis of a time constant, and performs feedback control for the pulse generation unit 20 on the basis of a result of the estimation.

Specifically, when a time constant, which is required until the load current becomes stable after the start of change thereof, is predetermined and a value of current flowing to the secondary side is estimated by the secondary-side current estimation unit 28, the load current is estimated on the basis of the primary-side current value that is input from the AD converter 26B and a predetermined time constant.

Accordingly, even though the power supply device 10 according to this embodiment performs feedback control for the pulse generation unit 20 at a high cycle, the load current is accurately controlled.

In the next step 106, it is determined whether or not a prescribed time has passed after the source of supply of power to the load 12 is switched to the constant current output circuit 14B. If it is determined that the prescribed time has passed after the switching of the source of supply of power, the processing proceeds to Step 108. If it is determined that the prescribed time has not passed after the switching of the source of supply of power, the processing returns to Step 104 and the feedback control performed for the pulse generation unit 20 at the second cycle is repeated. Meanwhile, the determination of whether or not the prescribed time has passed after the switching of the source of supply of power is performed by, for example, the AD converter 26B, and a result of the determination representing that the prescribed time has passed is output to the AD converter 26A.

In Step 108, the cycle of feedback control is changed into the first cycle from the second cycle. Feedback control performed at the second cycle is performed earlier than the first cycle, but the accuracy thereof is lower than the accuracy of the feedback control performed at the first cycle. Further, since the load current substantially reaches the prescribed value when the prescribed time has passed after the switching of the constant current output circuit 14, the power supply device 10 according to this embodiment can more accurately control the load current by changing the cycle of feedback control to the first cycle.

Specifically, the AD conversion of a primary-side current value into a digital value, which has been performed at the second cycle by the AD converter 26B, is performed at the first cycle and the digital value is output to the secondary-side current estimation unit 28, so that the change of feedback control to the first cycle from the second cycle is achieved. Further, the AD converter 26A also converts a primary-side voltage value into a digital value at the first cycle (AD conversion) and outputs the digital value to the secondary-side current estimation unit 28.

Meanwhile, the number of times of feedback control, which is performed for the prescribed time, is determined depending on the value of the second cycle. Accordingly, in other words, the prescribed period can be said to be the number of times of feedback control performed at the second cycle.

As described above, when abnormality occurs in the constant current output circuit 14 that supplies power to the load 12 and the power supply device 10 according to this embodiment switches the constant current output circuit 14, which supplies power to the load 12, to the other constant current output circuit 14, the power supply device 10 according to this embodiment changes the cycle of the feedback control, which is performed for the pulse generation unit 20 of the constant current output circuit 14 corresponding to the switching destination, to a second cycle that is higher than a first cycle in the constant current output circuit 14 that is not yet switched.

For this reason, even though the constant current output circuit 14 supplying power to the load 12 is switched, the power supply device 10 according to this embodiment can change power, which is output from the constant current output circuit 14 corresponding to the switching destination, to power, which is required by the load 12, in a shorter period of time.

The invention has been described using the above-mentioned embodiment. However, the technical scope of the invention is not limited to the description of the above-mentioned embodiment, and the above-mentioned embodiment may have various changes or modifications without departing from the scope of the invention, and embodiments including the changes or the modifications are also included in the technical scope of the invention.

For example, a case in which the power supply device 10 includes two constant current output circuits 14 has been described in the above-mentioned embodiment. However, the invention is not limited thereto, and may include an embodiment in which the power supply device includes three or more constant current output circuits 14. In the case of this embodiment, one constant current output circuit 14 supplies power to the load 12, and a plurality of the other constant current output circuits 14 are in a standby state. Further, when abnormality occurs in the constant current output circuit 14 that supplies power to the load 12, the constant current output circuit 14 supplying power to the load 12 is switched to one constant current output circuit 14 of the plurality of the other constant current output circuits 14 that are in the standby state.

Furthermore, a case in which the abnormality detection unit 32 outputs the abnormality detection signal when detecting abnormality has been described in the above-mentioned embodiment. However, the invention is not limited thereto, and may include an embodiment in which the abnormality detection unit 32 outputs a normal signal representing that abnormality does not occur when not detecting abnormality and stops outputting the normal signal when detecting abnormality. In the case of this embodiment, when the constant current output circuit 14 that is in the standby state does not receive the normal signal from the constant current output circuit 14 that supplies power to the load 12, the constant current output circuit 14 that supplies power to the load 12 is switched to the constant current output circuit 14 that is in the standby state.

Moreover, a case in which current flowing in the load 12 is estimated on the basis of the current flowing on the primary side and feedback control is performed for the pulse generation unit 20 on the basis of the result of the estimation has been described in the above-mentioned embodiment. However, the invention is not limited thereto, and may include an embodiment in which current flowing in the load 12 is directly detected and feedback control is performed for the pulse generation unit 20 on the basis of a result of the detection.

REFERENCE SIGNS LIST

10: power supply device
12: load
14A, 14B: constant current output circuit
20: pulse generation unit
30: PI feedback control unit

The invention claimed is:

1. A power supply device comprising:
a plurality of power supply units capable of supplying power to a load, wherein power is supplied to the load by a first power supply unit that is one of the plurality of the power supply units,
wherein each of the power supply units includes:
a pulse generating unit configured to generate a pulse voltage having a pulse width corresponding to a voltage and current to be output;
a feedback control unit configured to perform a feedback control of the pulse voltage, which is output from the pulse generating unit, so that the current flowing in the load reaches a prescribed value; and
an abnormality detection unit configured to detect an occurrence of an abnormality in the corresponding power supply unit,
wherein when the occurrence of the abnormality in the first power supply unit is detected by the abnormality detection unit of the first power supply unit, the first power supply unit stops the supply of power to the load, and a second power supply unit that is one of the plurality of the power supply units and is different from the first power supply unit starts the supply of power to the load, and
wherein a cycle of the feedback control of the second power supply unit is set to a second cycle shorter than a first cycle that is a cycle of the feedback control set to the first power supply unit.

2. The power supply device according to claim 1, wherein the second cycle is shorter than a time constant required until current flowing in the load becomes stable after starting to change due to the feedback control performed for the pulse generating unit.

3. The power supply device according to claim 2, wherein the feedback control unit estimates the current flowing in the load on the basis of the time constant, and performs the feedback control for the pulse generating unit on the basis of a result of the estimation.

4. The power supply device according to claim 3, wherein the cycle of the feedback control of the second power supply unit is changed to the first cycle from the second cycle when a prescribed time has passed after the supply of power to the load from the second power supply unit is started.

5. The power supply device according to claim 2, wherein the cycle of the feedback control of the second power supply unit is changed to the first cycle from the second cycle when a prescribed time has passed after the supply of power to the load from the second power supply unit is started.

6. The power supply device according to claim 1, wherein the cycle of the feedback control of the second power supply unit is changed to the first cycle from the second cycle when a prescribed time has passed after the supply of power to the load from the second power supply unit is started.

7. A power supply switching method of a power supply device, the power supply device includes a plurality of power supply units capable of supplying power to a load, wherein power is supplied to the load by a first power supply unit that is one of the plurality of the power supply units, wherein each of the power supply units includes a pulse generating unit configured to generate a pulse voltage having a pulse width corresponding to a voltage and current to be output, and a feedback control unit configured to perform a feedback control of the pulse voltage, which is output from the pulse generating unit, so that the current flowing in the load reaches a prescribed value, the power supply switching method comprising:

determining whether or not an abnormality has occurred in the first power supply unit;

stopping, when it is determined that the abnormality occurs in the first power supply unit, the supply of power to the load from the first power supply unit and starting the supply of power to the load from a second power supply unit that is one of the plurality of the power supply units and is different from the first power supply unit, setting a cycle of the feedback control of the second power supply unit to a second cycle shorter than a first cycle that is a cycle of the feedback control set to the first power supply unit.

\* \* \* \* \*